Sept. 18, 1956      B. L. FRIEDMAN      2,763,826

SAFE POWER PACK FOR PHOTO FLASH EQUIPMENT

Filed April 19, 1954      3 Sheets-Sheet 1

INVENTOR.
BERNARD L. FRIEDMAN
BY
ATTY.

Sept. 18, 1956      B. L. FRIEDMAN      2,763,826

SAFE POWER PACK FOR PHOTO FLASH EQUIPMENT

Filed April 19, 1954      3 Sheets-Sheet 2

INVENTOR.
BERNARD L. FRIEDMAN
BY Joseph Zallen
ATTY

Sept. 18, 1956 B. L. FRIEDMAN 2,763,826
SAFE POWER PACK FOR PHOTO FLASH EQUIPMENT
Filed April 19, 1954 3 Sheets-Sheet 3

INVENTOR.
BERNARD L. FRIEDMAN
BY
ATTY

2,763,826

SAFE POWER PACK FOR PHOTO FLASH EQUIPMENT

Bernard L. Friedman, Natick, Mass.

Application April 19, 1954, Serial No. 424,155

4 Claims. (Cl. 320—1)

This invention relates to power supplies for electronic photo-flash equipment. In particular, it relates to portable power packs which automatically break circuits and discharge condensers upon removal of the source of current.

Portable electronic photo-flash equipment usually consists of a flash lamp actuated by high voltage short-duration electrical pulses. The equipment is usually physically divided into the lamp assembly and power pack, which contains the power source, often stored in a carrying case. A flexible conductor connects the two parts. The most commonly used circuits involve high voltage discharge across condensers which are stored within the power pack. The primary power source in the power pack is either one or more replaceable dry-cell batteries or replaceable rectifier units connected as desired to a source of A. C. current.

In operating such electronic photo-flash equipment, the primary source of electrical energy keeps the condensers charged until an exterior switching means causes the bursting discharge to take place. Thus, even though the lamp is disconnected from the power pack, the power pack remains charged and presents a serious safety hazard to the operator. This hazard is especially acute when it is realized that there can often be a voltage load of 450 volts or more across a capacity of 1,000 microfarads or more. Replacement of the batteries by the user, who is usually inexperienced in the electrical art, can easily cause severe shock with attendant injury, especially if the chassis is removed from its case.

In accordance with the present invention this hazard is overcome by causing the condensers to be discharged and the circuit automatically opened when the operator removes the battery or equivalent from the power pack. This action takes place whether the lamp is connected or not. The circuit is not restored to its original position until all batteries or equivalents have been re-inserted in position. When the batteries are again in position this invention restores the circuit and allows the batteries to re-charge condensers.

This invention is best understood by reference to a preferred embodiment illustrated by the drawings in which Figure 1 is a side perspective view of the power pack with batteries in place and ready to engage the lamp leads;

Figure 1:
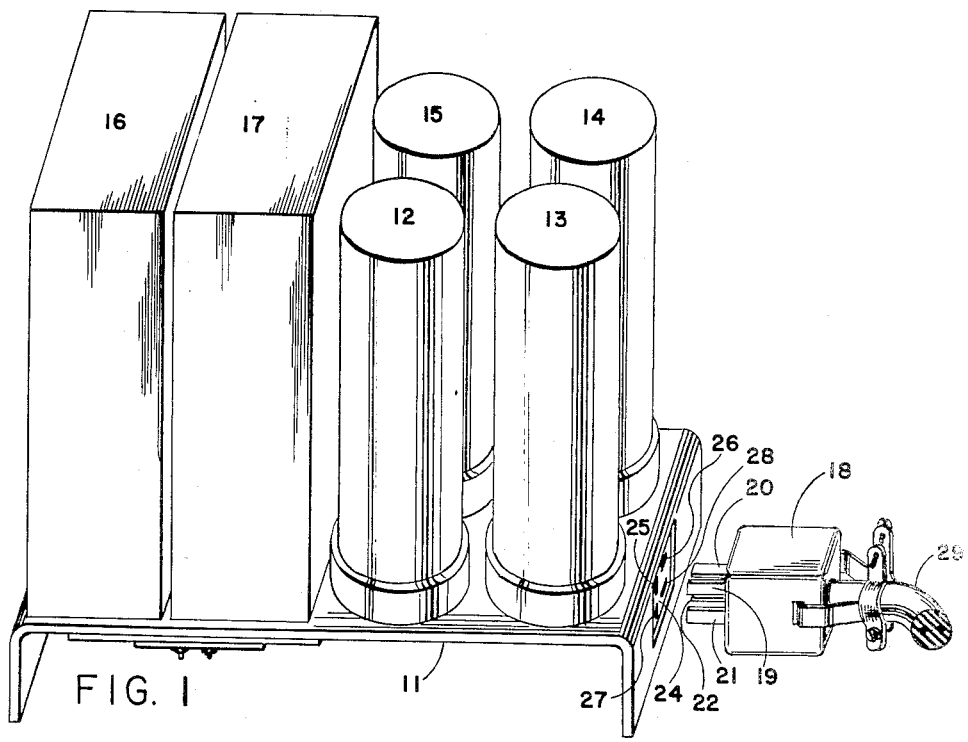

Referring now to the drawings, a support frame 11 is shown on which are mounted four condensers 12, 13, 14 and 15, and also two dry cell batteries 16 and 17. On the front of the frame 11 is a receptacle 24 cooperable with a plug 18 connected to the lamp line 29, the lamp not being shown. The plug 18 has two sets of prongs 19 and 20; 21 and 22. Prongs 19 and 20 connect with the lamp line 29 and cooperate with slots 25 and 26. Prongs 21 and 22 are connected together in the plug 18 by a conductor so that when the prongs 21 and 22 cooperate with terminals 27 and 28 they complete the circuit line 42, 43, connecting the two batteries 16 and 17. The functioning of terminals 25, 26, 27 and 28 is readily apparent from examination of Figures 5 and 6.

Figure 2:
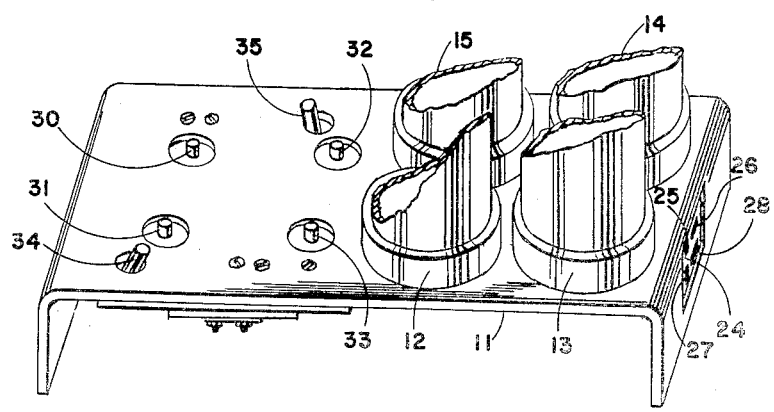
Figure 2 is a partial perspective view as in Figure 1, but with the batteries removed and the lamp leads not shown.
Figure 3:
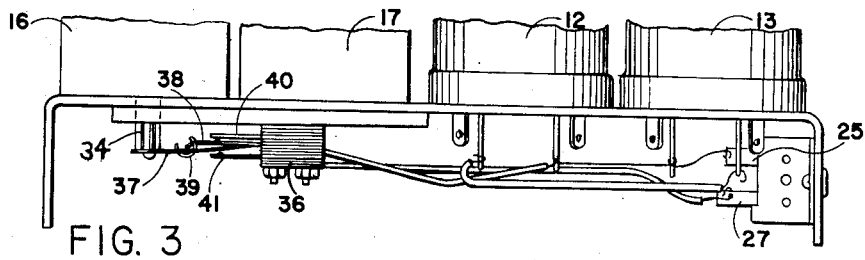
Figure 3 is a partial side view of the power pack showing the position of a safety switch with the batteries in position.
Figure 4:
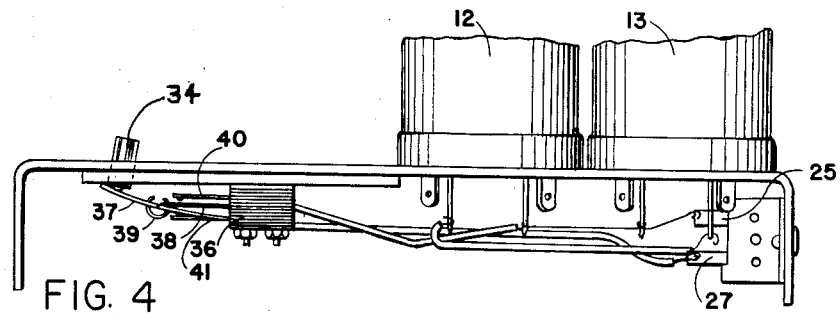
Figure 4 is a partial side view of the power pack showing the position of a safety switch with the batteries removed.

As illustrated in Figure 2, the batteries are mounted on the frame plugs 30, 31, 32 and 33 and when mounted act to depress the actuating plugs 34 and 35, of safety switches 36 and 36A (not shown). The mechanical action of each switch is identical and can be described in terms of switch 36 alone. Thus switch 36 is a snap ring leaf switch having its actuating plug 24 mounted on the end of leaf 37 which in turn is mounted on the frame body and connected by snap ring 39 to leaf 38. Depression of the plug 34 causes the ring 39 to snap and put leaves 38 and 37 in contact with leaf 40. Removal of the battery causes the ring 39 to snap back and put leaves 37 and 38 in contact with leaf 41 instead of leaf 40. As is apparent from Figures 5 and 6, this switch acts to electrically connect terminal 38 with either terminal 40 or terminal 41.

Figure 5:
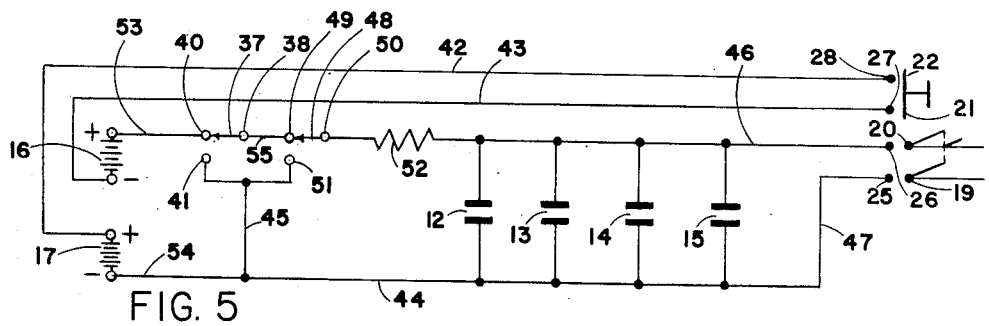
Figure 5 is a schematic circuit of the power pack when the batteries are in position.
Figure 6:
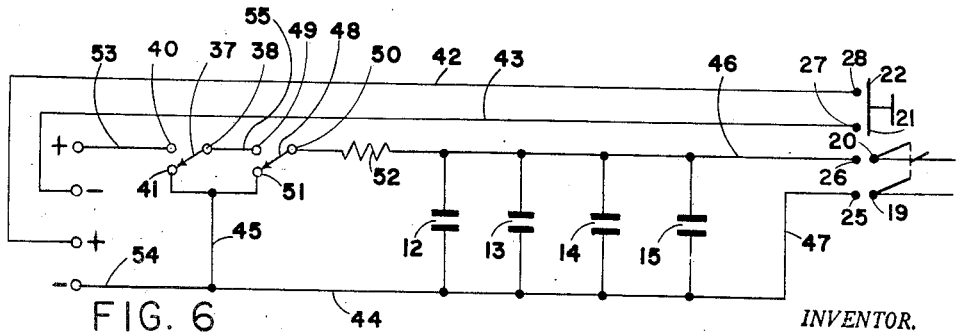
Figure 6 is a schematic circuit of the power pack when the batteries are removed.

When the battery is in place, and the leaves 37, 38, make contact with terminal 40, the circuit is complete thus permitting a charging current to flow from the positive terminal of battery 16 via conductor 53, terminal 40, switch 37, terminal 38, conductor 55, terminal 49, switch 48, terminal 50, resistance 52, and conductor 46 to one side of the condensers 12, 13, 14 and 15. If on the other hand the batteries have been removed the leaves 37, 38 now make contact with terminal 41 rather than with terminal 40 (Figure 6) so that two things have happened; namely, there is no longer a charging connection, i. e., the circuit has been broken, and further there now is a direct connection via switch 37, terminal 41, conductor 45, and conductor 44 to the opposite side of the condensers 12, 13, 14 and 15, thus forming a discharge path for the condensers. The branch 45 as shown in Figures 5 and 6 serves the switches for both batteries, but, as can be readily seen, removal of either battery or both serves to connect this branch with the positive side of the condensers. Both batteries must be re-inserted to restore the circuit and break the discharge path.

Figure 7:
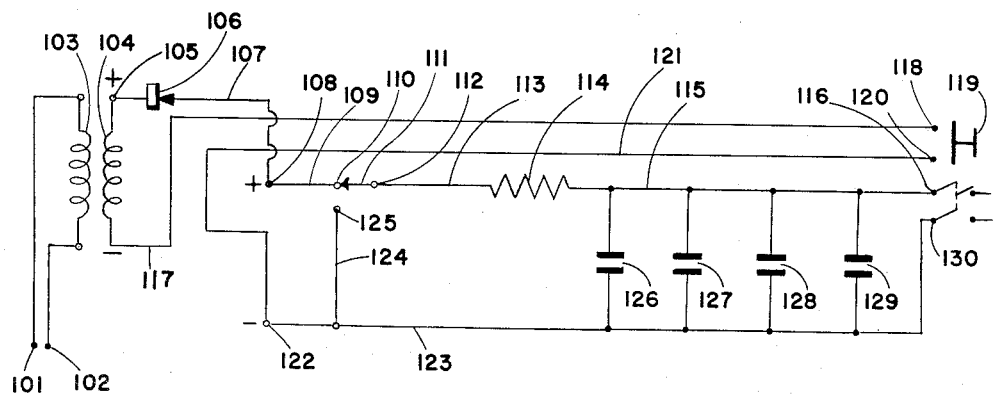
Figure 7 is a schematic circuit of the power pack wherein a single rectifier unit has replaced the two batteries in Figure 5.

Single or multiple batteries or equivalents can be used with either a separate switch for each or a switch actuable by either. Separate or joint discharge paths can be used. In place of batteries A. C. converter units may be used; a schematic of which is shown in Figure 7.

The A. C. converter unit is in position in the circuit shown in Figure 7, so that the switch actuating plug causes the switch 111 to connect terminals 110 and 112. Removal of the A. C. converter would allow the switch 111 to connect terminal 112 with terminal 125. The complete path in the case of the converter in position is as follows: A. C. input at 101 and 102 to the primary coil 103 of the transformer whose secondary coil is 104. The positive end 105 of the secondary coil is connected in series with a half-wave rectifier tube 106, conductor 107, positive terminal 108, conductor 109, terminal 11, switch 111, terminal 112, conductor 113, resistance 114, conductor 115, and terminal 116. The negative end of the secondary coil 104 is connected in series with conductor 117, terminal 118, connecting switch 119, terminal 120, conductor 121, negative terminal 122, conductor 123 and terminal 130. The condensers 126, 127, 128 and 129 are connected in parallel across conductors 115 and 123.

When the converter is removed the path is a discharge path running from terminal 116, conductor 115, resistance 114, conductor 113, terminal 112, switch 111, terminal 125, conductor 124, conductor 123 and terminal 130.

In this embodiment the shorting switch 119 is in the secondary circuit of the transformer, leaving the A. C. supply circuit operative. If desired, the shorting switch can instead be placed in the primary circuit of the transformer, thus shutting off the A. C. supply entirely when the plug containing both a shorting switch 119 and the line connectors (116, 130) is removed.

In place of the leaf switch shown other two-position switches may, of course, be substituted. Thus, the battery or converter can be equipped with an extension which would actuate the switch when placed in position, rather than have the bottom of the battery actuate a switch extension.

It can thus be seen that removal of any battery automatically discharges the condensers and opens the supply circuit so that there is no danger of shock to the user.

I claim:

1. An electrical device containing a removable source of direct current, capacitance connected in parallel with said source, and switching means actuable by the removal of said source to interrupt the electrical path between one side of said capacitance and said source and to also form a discharge path for said capacitance; the repositioning of said source acting on said switching means so as to cause it to interrupt said discharge path and complete said electrical path.

2. An electrical device containing a plurality of removable sources of direct current, capacitance connected in parallel with said sources, and switching means actuable by the removal of any of said sources so as to interrupt the electrical path between one side of said capacitance and said source and to also form a discharge path for said capacitance; the repositioning of no less than all such sources being required to cause such switching means to interrupt said discharge path and complete said electrical path.

3. An electrical device containing means for receiving a removable source of direct current, capacitance connected in parallel with said means, and a switch normally acting to interrupt the principal electrical path between one side of said capacitance and said receiving means and to also complete a discharging electrical path between both sides of said capacitance; said switch being actuable by the attachment of a source of direct current to said means so as to interrupt said discharging path and to also complete said principal electrical path.

4. In an electrical device, a removable source of direct current and capacitance, both connected in parallel across a pair of electrical conductors, and a switch having two positions; the first switch position acting to open a portion of one conductor between said source and capacitance and to also form an electrical path between said conductors parallel to said capacitance; said second position interrupting said electrical path and also closing the conductor portion aforesaid; said first switch position existing in the absence of said source; said second switch position being actuated by the positioning of said removable source in the device.

References Cited in the file of this patent

UNITED STATES PATENTS 2,659,854      Wengel _____ Nov. 17, 1953